US006850934B2

(12) United States Patent
Bates et al.

(10) Patent No.: US 6,850,934 B2
(45) Date of Patent: Feb. 1, 2005

(54) ADAPTIVE SEARCH ENGINE QUERY

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 09/817,613

(22) Filed: Mar. 26, 2001

(65) Prior Publication Data

US 2002/0138479 A1 Sep. 26, 2002

(51) Int. Cl.⁷ .............................................. G06F 17/30
(52) U.S. Cl. .................... 707/5; 707/3; 707/4; 707/6; 707/9; 707/10; 707/102
(58) Field of Search ......................... 707/3, 9, 10, 102, 707/4, 5, 6; 370/463; 709/217, 245; 704/8

(56) References Cited

U.S. PATENT DOCUMENTS

| | | | |
|---|---|---|---|
| 5,499,360 A | | 3/1996 | Barbara et al. ............. 395/600 |
| 5,911,139 A | | 6/1999 | Jain et al. ...................... 707/3 |
| 5,953,718 A | | 9/1999 | Wical |
| 5,956,711 A | | 9/1999 | Sullivan et al. ................ 707/6 |
| 6,026,409 A | | 2/2000 | Blumenthal .................. 707/104 |
| 6,052,714 A | * | 4/2000 | Miike et al. ................. 709/217 |
| 6,074,300 A | | 6/2000 | Hirano et al. ................. 463/43 |
| 6,094,649 A | | 7/2000 | Bowen et al. .................. 707/3 |
| 6,134,549 A | * | 10/2000 | Regnier et al. ................ 707/9 |
| 6,154,783 A | * | 11/2000 | Gilmour et al. ............. 709/245 |
| 6,205,418 B1 | * | 3/2001 | Li et al. ......................... 704/8 |
| 6,381,598 B1 | * | 4/2002 | Williamowski et al. ........ 707/5 |
| 6,411,961 B1 | * | 6/2002 | Chen .......................... 707/102 |
| 6,424,968 B1 | * | 7/2002 | Broster et al. .................. 707/3 |
| 6,434,552 B1 | * | 8/2002 | Leong ............................ 707/4 |
| 6,457,010 B1 | * | 9/2002 | Eldering et al. .............. 707/10 |
| 6,460,036 B1 | * | 10/2002 | Herz ............................ 707/10 |
| 6,470,332 B1 | * | 10/2002 | Weschler ....................... 707/3 |
| 6,529,864 B1 | * | 3/2003 | Chase ........................... 704/9 |
| 6,542,515 B1 | * | 4/2003 | Kumar et al. ............... 370/463 |
| 6,571,234 B1 | * | 5/2003 | Knight et al. .................. 707/3 |
| 6,598,040 B1 | | 7/2003 | Cragun et al. |
| 6,604,101 B1 | * | 8/2003 | Chan et al. .................... 707/4 |
| 6,671,691 B1 | | 12/2003 | Bigus |
| 2001/0047354 A1 | * | 11/2001 | Davis et al. .................... 707/3 |

FOREIGN PATENT DOCUMENTS

| | | | |
|---|---|---|---|
| EP | 0 495 622 A2 | 7/1992 | ......... G06F/15/401 |
| JP | 11-272706 | 8/1999 | ........... G06F/17/30 |

OTHER PUBLICATIONS

Hull, "Method and apparatus for terminology translation", US Patent Application Publication, 8–2002, pp. 1–12.*

* cited by examiner

Primary Examiner—Thuy N. Pardo
(74) Attorney, Agent, or Firm—Moser, Patterson & Sheridan, L.L.P.

(57) ABSTRACT

Embodiments provide a method, article of manufacture, and apparatus for searching for information on a network of computers using a modified search query. The search query is modified using translation data. The translation data is any information having a predefined association with the search query content. In one aspect, the translation data comprises a location value and a demographic profile value. The location value, demographic profile value, and search content may include any number and types of characters, keywords, symbols, numerals, etc. Upon receiving a search query, a translation program takes step to locate any keywords within the search content, wherein the keywords indicate that translation data is available for modifying the search query. If the search content contains keywords, then steps are taken to modify the query. The modified query may then be executed by a search tool. In some embodiments, the search tool and the translating program are integrated.

22 Claims, 8 Drawing Sheets

USER PROFILE - 150 510

| | 512 |
|---|---|
| 502 — USER1 | SHANNON |
| 504 — AGE | 15 |
| 506 — SEX | FEMALE |
| 508 — LOCATION | CA |

*Fig. 5*

LOCATION DATA - 152

| 602 SEARCH WORD | 604 SAN FRANCISCO | 606 ATLANTA | 608 CHICAGO | 610 LOCnth... |
|---|---|---|---|---|
| POP | MUSIC | MUSIC | SODA POP | ... |
| JAM | MUSIC | JELLY | JAZZ MUSIC | ... |
| SINGLE | NIGHT CLUB | PARTY | SOLO | ... |
| STELLAR | STARS | COOL | GREAT | ... |
| ROLL | BREAD | BREAD | MONEY | ... |
| FRENCH | FRENCH BREAD | FRANCE | KISS | ... |
| RIP | GUITAR | TEAR | BLUES | ... |
| ... | ... | ... | ... | ... |

*Fig. 6*

PROFILE DATA - 154

| PROFILE RECORD | PROFILE DATA | SEARCH WORD | KW1 | KW2 | KWnth |
|---|---|---|---|---|---|
| AGE | 15 | POP | SOFT DRINK | COLA | ... |
| SEX | FEMALE | HIT | MUSIC | | ... |
| LOCATION | CA | SINGLE | MUSIC | | ... |
| GRADE | HIGH SCHOOL | STELLAR | FANTASTIC | | ... |
| LIKE | MUSIC | ROLL | LAUGH | | ... |
| LIKE | SHOPPING | FRENCH | FRENCH FRIES | | ... |
| LIKE | MAKEUP | RIP | GUITAR SOLO | MUSIC | ... |
| LIKE | DANCE | HOT DOG | SNOW BOARD | | ... |
| LIKE | ANIMALS | DOG | SLOW | | ... |
| | | LICKS | TROMBONE | JAZZ | ... |
| ... | ... | ... | ... | ... | ... |

*Fig. 7*

ADAPTIVE SEARCH ENGINE QUERY

BACKGROUND OF THE INVENTION

1. Field of the Invention

Embodiments of the invention generally relate to data-processing. More particularly, the invention relates to searching for information on a computer network.

2. Background of the Related Art

Computer networks were developed to allow multiple computers to communicate with each other. In general, a network can include a combination of hardware and software that cooperate to facilitate the desired communications. One example of a computer network is the Internet, a sophisticated worldwide network of computer system resources.

The growing size of networks, particularly the Internet, makes it difficult to locate relevant information in an expedient fashion. As a result, search tools were developed to locate information on the network based on a query input by a user. Two common search methods include the use of search engines and directories, both having capability to search listings. One difference between search engines and directories is in the manner in which each tool compiles listings. Search engines comprise a search tool referred to as a spider, a crawler, or a robot, which builds indexes containing the traversed addresses according to well-known protocols and algorithms. The results are then displayed to the user for review and selection.

A user-input query in the form of search words phrases, keywords, network addresses, etc., prompts the search engine to sift through the plurality of network addresses (typically on the order of millions) in the index to find matches to the user query. Regardless of the particular search tool structure, conventional search tools reside on a server accessible to multiple users. Search queries are sent from the users to the search tools via a network connection. The search tools then parse the query and execute a search algorithm to identify any network addresses containing information matching the query. In theory, spiders are capable of traversing the entire Internet to locate matching URLs. In practice, however, only a small fraction of the Internet is traversed. Directories are similarly limited because the indexes are selectively compiled by human operators.

One problem with conventional search tools is the relevancy of the search results is dependent on the user's ability to craft a query. While searching a network of computers such as the Internet, a user may come across thousands of different network addresses having different themes relating to their query depending on the search engine's method of processing the query, and performing the search. Unfortunately, the results of the search query may not match the user's desired result due to different word meanings, e.g., dialects, slang meanings, and the like. For example, consider the case where a user enters a query about a soft drink by entering a keyword "pop", which is the user's slang word for soda pop. The search engine may return the results with regard to "pop music". The user then must modify the query by adding, replacing, and combining the search words, phrases, and the like. Eventually, given the proper query, the search engine may return the proper results to the user. Thus, the search can be frustrating for the user, as they may have to modify the query many times to produce meaningful results.

Therefore, there is a need for a search tool adapted to search network addresses for a user query and provide meaningful and relevant results.

SUMMARY OF THE INVENTION

Embodiments include a method, article of manufacture, and apparatus for searching network information, location-specific data, and profile data comprising, for example, network addresses, geographic locations, demographics, and the like. One embodiment, generally provides a method of searching for information, on a computer connected to a network of computers. The method comprises receiving a search query comprising search content, modifying the search query using at least one translation keyword to provide a modified search query, wherein the at least one translation keyword has a pre-defined association with the search content. The method further comprises providing the modified search query to a search tool, searching the network using the modified search query, and returning search results by the search tool to a browser program for display.

Another embodiment provides a signal-bearing medium containing a query translation program, wherein the translation program, when executed by a processor, performs a method of searching for information on a computer connected to a network of computers. The method comprises receiving a search query comprising search content, modifying the search query using at least one translation keyword to provide a modified search query, wherein the at least one translation keyword has a pre-defined association with the search content. The method further comprises providing the modified search query to a search tool, searching the network using the modified search query, and returning search results by the search tool to a browser program for display.

Still another embodiment provides a method of searching for information, on a computer connected to a network of computers. The method comprises receiving a search query comprising search content, providing at least one translation keyword having a pre-defined association with the search content and modifying, using the at least one translation keyword, the search query to provide a modified search query. The modified search query is then provided to a search tool.

Yet another embodiment provides a signal-bearing medium containing a query translation program, wherein the translation program, when executed by a processor, performs a method of searching for information on a computer connected to a network of computers. The method comprises receiving a search query comprising search content, providing at least one translation keyword having a pre-defined association with the search content and modifying, using the at least one translation keyword, the search query to provide a modified search query. The modified search query is then provided to a search tool.

BRIEF DESCRIPTION OF THE DRAWINGS

So that the manner in which the above recited features and embodiments can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 illustrates one embodiment of a corresponding user profile data structure.

FIG. 6 illustrates several data structures related to a word meanings associated with a geographic location.

FIG. 7 illustrates several data structures related to a word meanings associated with a demographic profile.

DETAILED DESCRIPTION OF THE PREFERRED EMBODIMENTS

Figure 1:
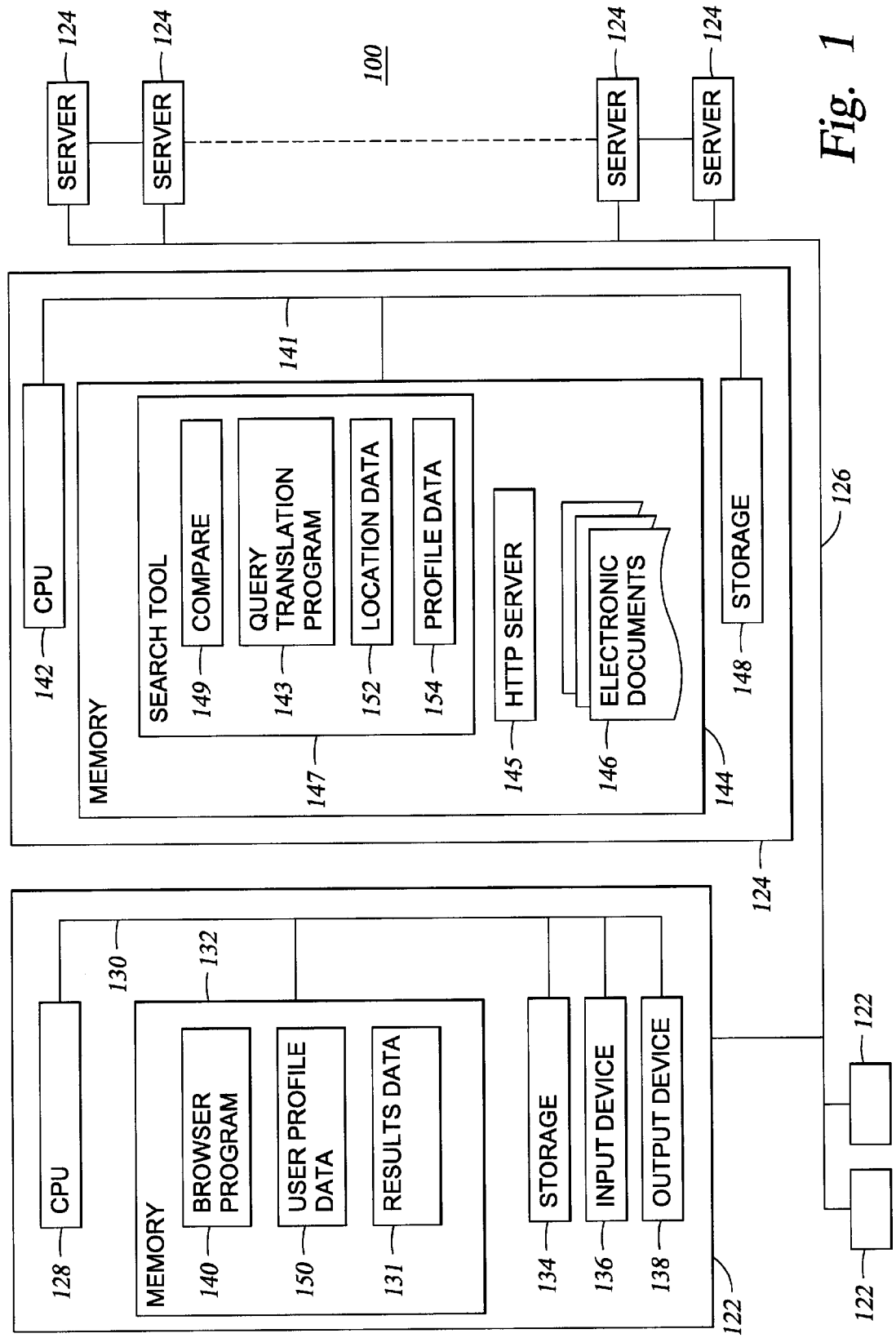
FIG. 1 depicts a data processing system in which one embodiment may be implemented.

Embodiments provide a method, article of manufacture, and apparatus for searching for information on a network of computers using a modified search query. The search query is modified using translation data. The translation data is any information having a predefined association with the search query content. In one aspect, the translation data comprises a location value and a demographic profile value. The location value, demographic profile value, and search content may include any number and types of characters, keywords, symbols, numerals, etc. Upon receiving a search query, a translation program takes steps to locate any keywords within the search content, wherein the keywords indicate that translation data is available for modifying the search query. If the search content contains keywords, then steps are taken to modify the query. The modified query may then be executed by a search tool. In some embodiments, the search tool and the translating program are integrated.

As used herein "value" includes any data regardless of format, or length. A value may be a single character (e.g., letter, numeral, symbol, etc.) or may be a string of characters (e.g., a phrase). Illustrative values described herein include demographic profile values and location values. In one embodiment, such values are related to an entity (e.g., a user operating a browser) providing a query to a search tool. As such, the values may be used to modify the query in an effort to affect the results returned from the search tool. Other values include the original (i.e., before being modified) contents and modified contents of a search query.

As used herein "pre-defined association" means that a fixed/static association between data/values exist. In particular, the association relates (or links) words, phrases, numerals, letters, symbols, etc., with one another. "Pre-defined" indicates that the association exists prior to executing a query. In one embodiment, associated data is contained in a table having a plurality of records. The table data may be formatted to define associations between the data. In particular, the association may be such that search query contents may be used to locate associated data in order to modify the search query content data.

As will be described below, aspects of one embodiment pertain to specific method steps implementable on computer systems. In one embodiment, the invention may be implemented as a computer program-product for use with a computer system. The programs defining the functions of at least one embodiment can be provided to a computer via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

FIG. 1 depicts one embodiment of a data processing system 100. In general, the data processing system 100 includes a client (e.g. user's) computer 122 and at least one server 124 (five such servers 124 are shown). The client computer 122 and the server computer 124 may be the components of the same computer system, or may be connected via a network 126, such as the Internet. The client computer 122 includes a Central Processing Unit (CPU) 128 connected via a bus 130 to a memory 132, storage 134, input device 136, and output device 138. The input device 136 can be any device to give input to the client computer 122. For example, a keyboard, keypad, light-pen, touch-screen, trackball, or speech recognition unit could be used. The input device may also be an external device or computer used to determine the physical location of the user's computer such as a global positioning system (GPS). The output device 138 is preferably any conventional display screen and, although shown separately from the input device 136, the output device 138 and input device 136 could be combined. For example, a display screen with an integrated touch-screen, and a display with an integrated keyboard, or a speech recognition unit combined with a text speech converter could be used. Storage 134 is preferably a direct access storage device (DASD), although it is shown as a single unit, it could be a combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Memory 132 is preferably random access memory sufficiently large to hold the necessary programming and data structures located on the client computer 122. While memory 132 is shown as a single entity, it should be understood that memory 132 may in fact comprise a plurality of modules, and that memory 132 may exist at multiple levels, from high speed registers and caches to lower speed but larger DRAM chips. Memory 132 contains a browser program 140 that, when executed on CPU 128, provides support for navigating between the various servers 124 and locating network addresses at one or more of the servers 124. In one aspect, memory 132 contains profile data 150 that may comprise data either specific to the client computer 122 that many people may have access to, and/or data such as the users name, company, address, phone number, age sex, and the like, specific to a particular user who may login under a "username" on the client computer 122.

Each server computer 124 generally comprises a CPU 142, a memory 144, and a storage device 148, coupled to one another by a bus 141. Memory 144 is a random access memory sufficiently large to hold the necessary programming and data structures that are located on the server computer 124. As shown, the memory 144 includes a hypertext transfer protocol (http) server process 145 adapted to service requests from the client computer 122. For example, process 145 may respond to requests to access electronic resource(s) 146 (e.g., HTML documents, network information, and the like) residing on the server 124. The http server process 145 is merely illustrative and other embodiments adapted to support any known and unknown protocols are contemplated. The programming and data structures may be accessed and executed by the CPU 142 as needed during operation.

Memory 144 further includes various data structures. Illustratively, memory 144 is shown containing a location data structure 152, and a profile data structure 154. In one embodiment, the data within the location data structure 152 represents geographic locations, regions, or other physical locations. For example, the location data structure 152 may include locations by a specific geographical location such as by city, e.g., San Francisco, London, Paris, Boston, and the like. In another embodiment, the location data structure 152 contains regional data, e.g., the western United States, Asia, Africa, and the like. In one embodiment, the profile data structure 154 contains word meanings associated with a demographic profile, e.g., ethnic groups, religion, race, age, sex, income, assets, political affiliation, general demographic data, dialect, and the like.

In one embodiment, a network search tool 147 resides within memory 144. When executed on CPU 142 in response to receipt of a search query, the network search tool 147 searches the system of servers 124 for information pertaining to the query. The network search tool 147 includes a network address comparison routine 149 that when executed on CPU 142, compares data files for matching network addresses and generates results to be sent to the client computer 122.

In another embodiment, a query translation program 143 resides within memory 144. When executed on CPU 142 in response to receipt of a search query, the query translation program 143 transforms the query search data (such as keywords, phrases, and/or symbols) into a modified query which includes keywords, search phrases, and the like, representing the meanings of the query with respect to a location e.g., geographic locations such as cities, countries, states, provinces, geographic regions, and the like. In another aspect, the query is transformed into a modified query representing a particular demographic profile, e.g., ethnic groups, religion, race, age, sex, income, assets, political affiliation, general demographic data, dialect, and the like. Query translations are accomplished by modifying the contents of the search query. Translation is defined as transforming by adding, replacing, combining, and the like, word(s) and/or phrase(s), to form new word(s) and/or phrase (s). For example, the query can be transformed by replacing the original search word(s), with alternative translation keyword word(s), and/or combining the original search word(s) together with the translation keyword word(s) to form a new word(s). Any combination of search words and phrases can be translated in similar or identical manner. The resultant translated search query is used by the search tool 147 to search the system of servers 124 for information. The search results are then returned to the user via output device 128.

FIG. 1 is merely one configuration for data processing system 100. Embodiments of the invention can apply to any comparable configuration, regardless of whether the computer system is a complicated multi-user computing apparatus, a single-user workstation, or network appliance that does not have non-volatile storage of its own.

Figure 2:
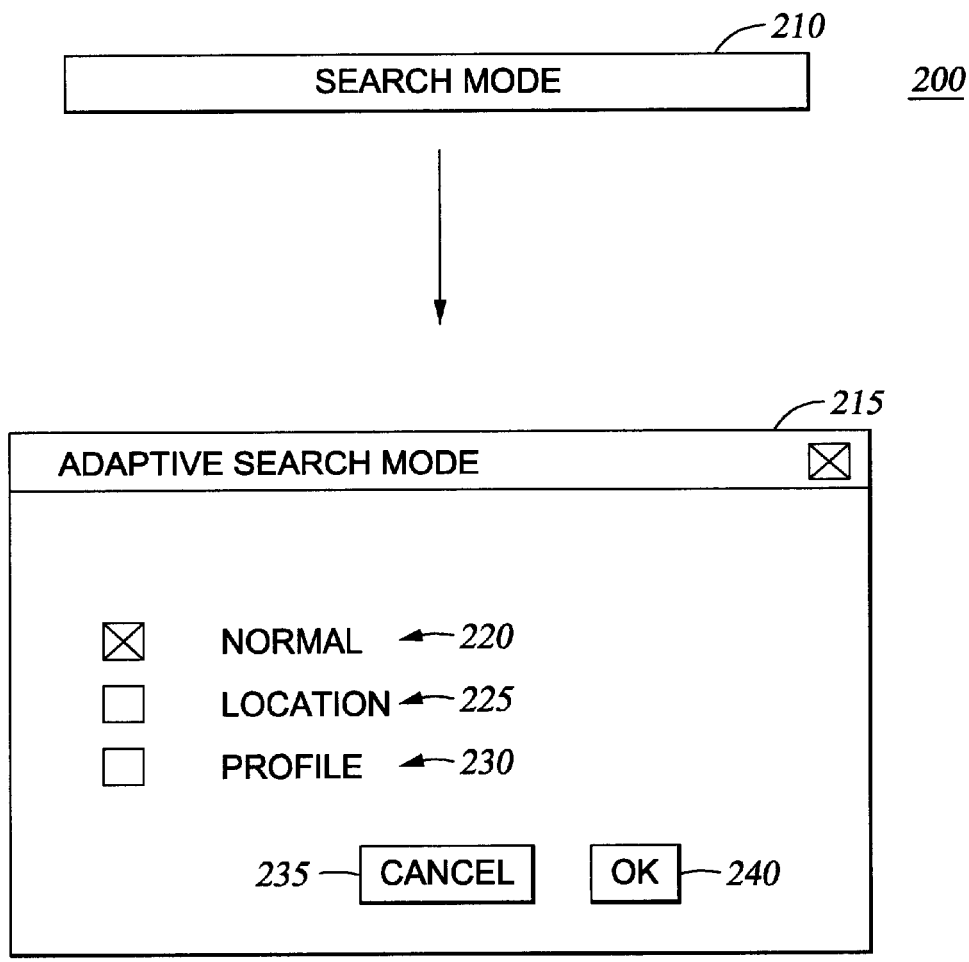
FIG. 2 depicts a graphical user interface display screen allowing the user to select the search mode.

FIG. 2 depicts one embodiment of a GUI interface 200. FIG. 1 is referenced within the following discussion of FIG. 2 as is necessary. FIG. 2 depicts an embodiment using features (e.g., radio buttons, hyper-links, check-boxes, and the like) for selecting a normal search, a location, or a profile as search criteria. A search mode button 210, when selected from a search tool 147 through browser program 140, activates an adaptive search mode window 215. In one aspect, the search tool 147 may have a hyper-link specifically for advanced search criteria, such as an "advanced search" hyper-link, where the function of FIG. 2 may reside.

When activated, the adaptive search mode window 215 allows the user to modify, e.g., translate, the data within a query for a search of the network 126, with respect to either location or a demographic profile. Additionally, the adaptive search mode window 215 includes a "normal" check box 220 allowing the user to search the query without translation. Check boxes 225 and 230 provide additional flexibility to the user in determining which translation the user desires. Thus, when check box 225 is selected, the search includes a query translation with respect to a desired geographic location and when check box 230 is selected, a translation with respect to a demographic profile is included in the search.

It is contemplated that the profile data 154 may include the geographical location of the location data 152, in which case selecting both check boxes may result in duplicate search results being returned to the user. Therefore, in one embodiment, the check boxes 225 and 230 are only independently selectable. In other embodiments, other steps can be taken to eliminate duplicate search results such as eliminating all but one of the duplicative search results when both check boxes are selected. If no selection within the adaptive search mode window 215 is made, then the query is not transformed and proceeds as a normal query and search.

Figure 3:
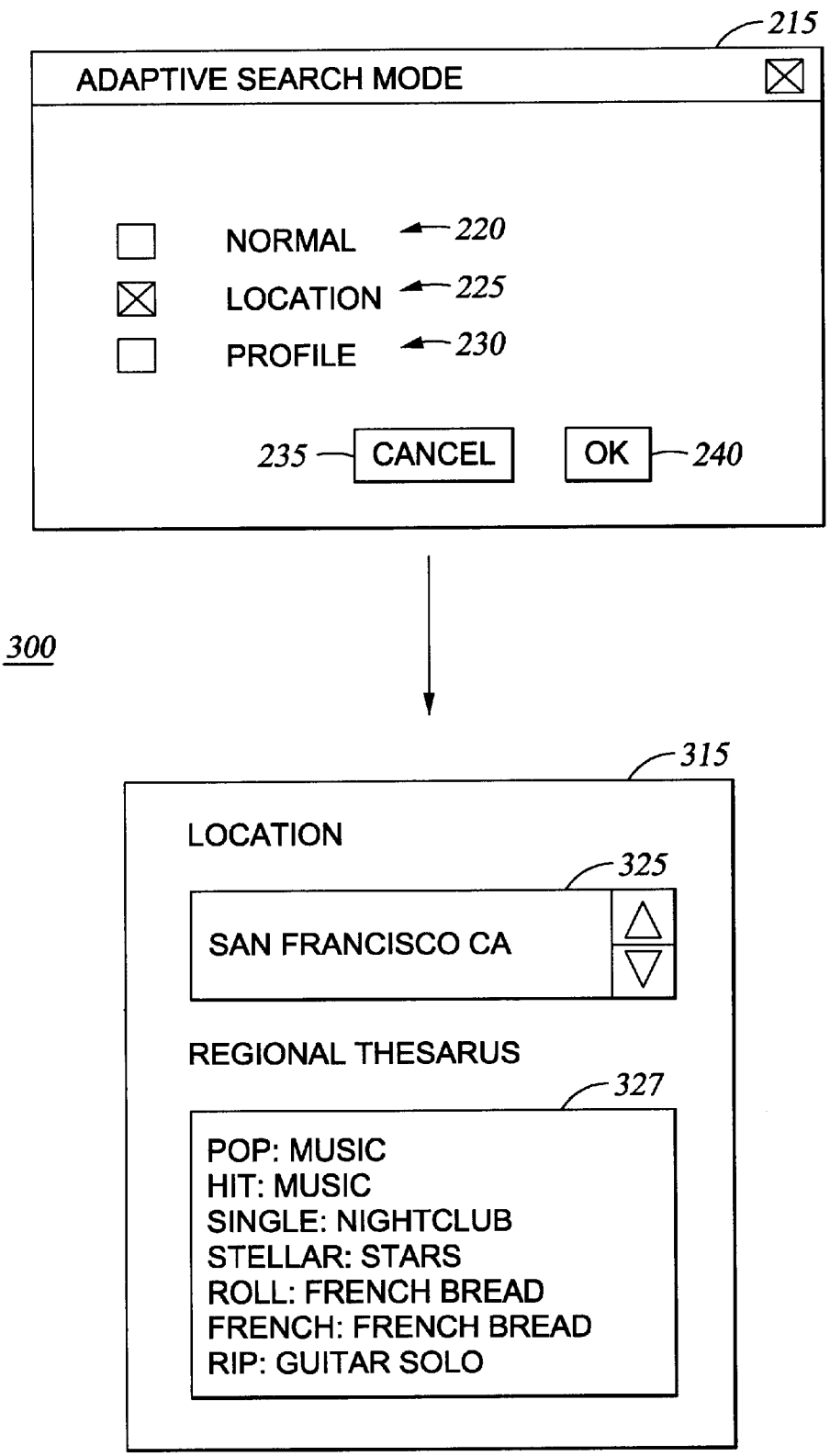
FIG. 3 depicts a graphical user interface display screen allowing the user to select the search with respect to a location.

FIG. 3 depicts one embodiment of the invention using a graphical user interface display screen 300 to allow the user to select the search with respect to a location. FIGS. 1 and 2 are referenced within the following discussion of FIG. 3 as is necessary. FIG. 3 depicts an embodiment using features (e.g., radio buttons, hyperlinks, and check-boxes) for selecting a location or profile as search criteria.

Selecting location button 225 activates a location criteria window 315. The location criteria window 315 includes a location selection window 325, allowing the user to select the desired search translation based on location using data stored in location data structure 152. Illustratively, one aspect of the invention uses major cities to define a particular region. For example, San Francisco may be used to represent a region defined by the western United States. Regions may be defined by any number of variations including, demographics such as race, population size, country, religion, and the like.

In another embodiment, the location criteria window 315 also includes a regional thesaurus window 327. The regional thesaurus window 327 includes translation keyword data specific to a region located in the location data structure 152. For example, consider the case where the western United States is defined and represented by San Francisco, Calif. Thus, when San Francisco, Calif. is selected in the location selection window 325, the regional thesaurus window 327 includes words with specific meanings to the western United States. For example, "pop" with respect to the western United States may relate to the words "popular music". In one aspect of the invention, the regional thesaurus window 327 is adapted to allow the user to modify the data within the location data structure 152 to further refine their specific word meanings in relation to a particular region.

Figure 4:
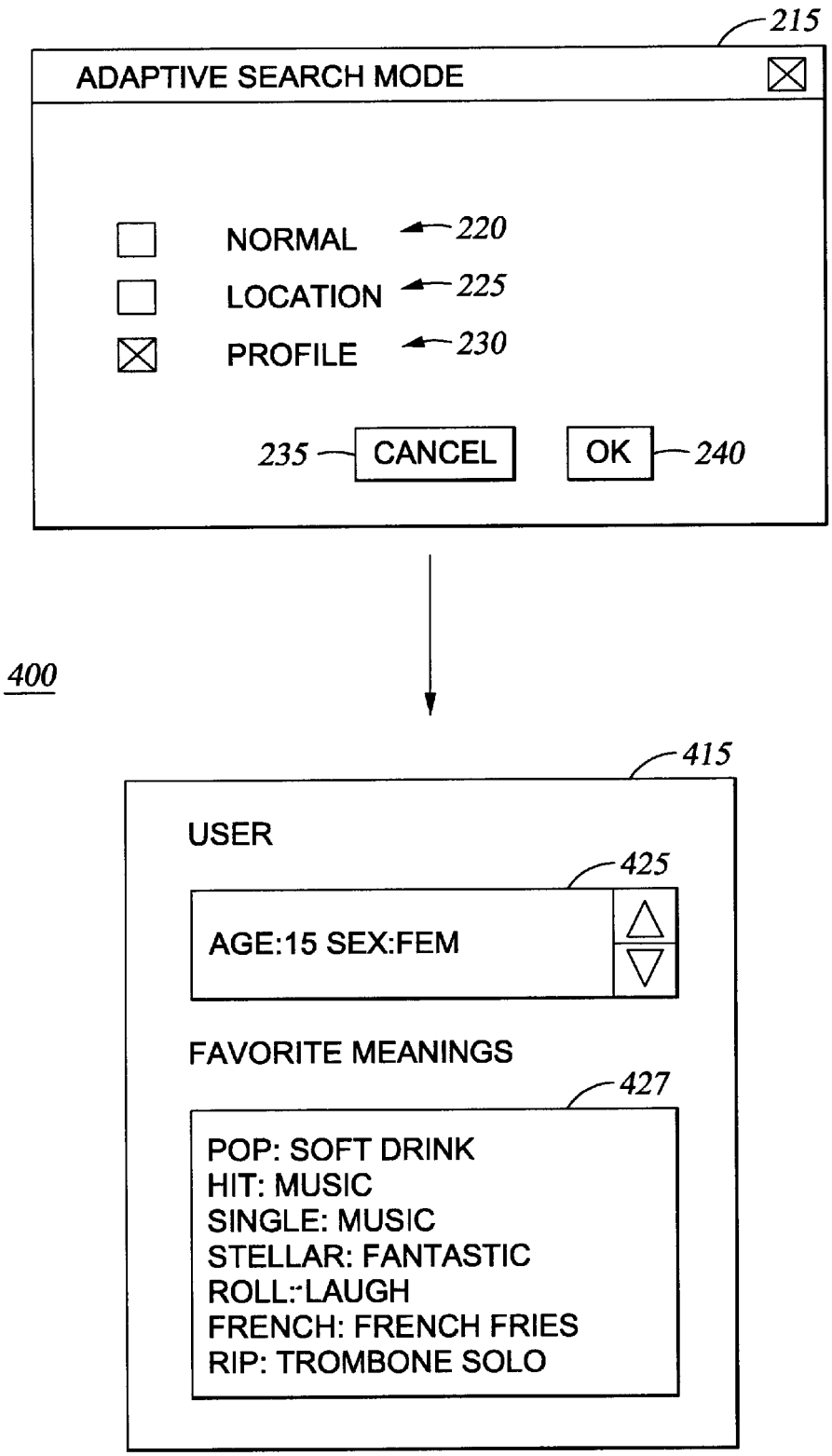
FIG. 4 depicts a graphical user interface display screen allowing the user modify the search mode with respect to a user profile.

FIG. 4 depicts a graphical user interface display screen 400 allowing the user to modify the search with respect to a demographic profile. FIGS. 1–3 are referenced within the following discussion of FIG. 4 as is necessary. FIG. 4 depicts an embodiment of the invention using features (e.g., radio buttons, hyper-links, and checkboxes) for selecting a profile as search criteria. Selecting profile button 230 activates a profile criteria window 415. The profile criteria window 415 includes a profile selection window 425, allowing the user to select the desired profile search translation based on profile data stored in the profile data structure 154. Profiles may be defined by any number of demographic variations including general demographics such as address, race, age, likes, dislikes, cloth size, music, travel, religion, and the like.

In another embodiment, the profile criteria window 415 also includes a profile thesaurus window 427. The profile thesaurus window 427 includes demographic profile data specific to a profile located in the profile data structure 154. For example, consider the case where a profile for a 15-year-old girl is selected from profile selection window 425. The profile thesaurus window 427 includes words with specific meanings to a 15-year-old girl profile. For example, "pop" means "soft drink", and "stellar" means "fantastic". In one aspect of the invention, the profile thesaurus window 427 is adapted to allow the user to modify the data within the profile data structure 154 to further refine their specific word meanings in relation to a particular selected profile.

FIG. 5 illustrates one embodiment of the user profile data structure 150. FIGS. 1–4 are referenced within the following discussion of FIG. 5 as is necessary. User-specific data entered for a user profile is stored in the user profile data structure 150. Each row 502–508 of the user profile data structure 150 is considered one record. The user profile data structure 150 includes a user information column 510 including the user name row 502, user age row 504, user's sex row 506, and the user's location row 508 (e.g., address). The user profile data structure 150 also includes a data column 512 with user data corresponding to each entry of the user information column 510.

FIG. 6 illustrates one embodiment of the data structure 152 and includes word meanings specific to geographic locations. FIGS. 1–5 are referenced within the following discussion of FIG. 6 as is necessary.

Data entered for a translation of a query with respect to a geographic region is stored in the location data structure 152. Each row of the location data structure 152 is considered one record. The location data structure 152 includes a search keyword column 602 that includes search keywords available for the translation of the location search query. The data table 152 also includes a translation keyword columns 604–610 specific to geographic regions, where the LOCnth column 610 represents an nth number of available translation keyword columns 604–610. Within the translation keyword columns 604–610 are translation keywords corresponding to the search keyword from column 602. For example, for the search word "pop", if San Francisco is picked as the desired location, the word "pop" has a translation keyword of "music" corresponding to the corresponding cell within the first translation keyword column 604. Additionally, with respect to the location of Atlanta, "pop" translates within a second translation keyword column 606 to "music". Further, with respect to the location Chicago, "pop" translates within the third translation keyword column 608 into "soda pop", and so on with respect to the LOCnth column 610 translation keywords. Although, in one embodiment it is illustrated that locations relate to specific cities, other embodiments are contemplated whereby the location can relate to any geographic region, or may relate to other regional defining criteria that may classify a particular dialect or population classification such as westerners, easterners, southerners, northerners, Canadians, Americans, and the like. In one embodiment, it is contemplated that the various regional location data may be combined to expand the search across several different groups, for example, comparing the word for "pop" using both the first translation keyword column 604 and third translation keyword column 608 results in the meanings being combined to search for both music and soda pop. In another embodiment, the last location specified by the user is marked within the location data structure 152 and is used by the query translation program 143 when initialized to define a default location selection.

FIG. 7 illustrates the data structure 154 and includes word meanings specific to a profile. FIGS. 1–6 are referenced within the following discussion of FIG. 7 as is necessary.

Translation keyword data entered for a translation of a query with respect to a profile is stored in the profile data structure 154. Each row of the profile data structure 154 is considered one record. The profile data structure 154 includes a profile record column 702 to define each record, a profile data column 704 to store profile data corresponding to each profile, a search word column 706 that includes keywords available to translate. The data structure 154 also includes profile keyword columns 708–712 specific to a profile, where the KWnth column 712 represents an nth number of available profile keyword columns 708–712. Within the profile keyword columns 708–712 are translation keywords corresponding to the search word from column 706. For example, if the keyword "pop" is picked as the desired search word, the word "pop" has a word translation keyword of "soft drink" corresponding with the corresponding cell within the first profile keyword column KW1 708. In addition, the word translation keyword for "soft drink" also translates to "cola" within the second profile keyword column KW2 710, and so on, with respect to the data within the KWnth column 710.

Although, in one embodiment it is illustrated that locations relate to generic profile data, other embodiments are contemplated whereby the profile can be filtered and/or adapted to only include specific information, to help further refine the translation and subsequent search. For example, as a user enters more profile selections, a more specific profile may be generated. Illustratively, the profile thesaurus window 427 may be used to refine the profile by adding, modifying, and/or deleting translation keywords and/or search words within the profile data structure 154.

The location search word data, column 602, and the associated location keyword data, columns 604–610, may be gathered using several methods so that the user does not have to enter each term for a location. Furthermore, the profile data, columns 702–704, the profile search word data, columns 704, and associated profile keyword data, columns 708–610, may be gathered using several methods so that the user does not have to enter each term for a profile. In one embodiment, well-known statistical calculations and survey techniques may be adapted to generate the search word and keyword data. For example, the user may be asked to fill out a form such as a survey form, questionnaire, registration form, and the like. Regardless of the form used, the user's form may have search words and translation keywords that the user enters in response to questions and inquiries on for example, the users likes and dislikes. In addition, profile data may be collected from each client computer by acquiring the user's profile data 150 as part of the survey. The data may also be entered by downloading information from data sources such as a thesaurus, encyclopedias, dictionaries, and the like. Furthermore, modifications to the data that through windows such as the regional thesaurus window 327 and profile thesaurus window 427 may be collected by the server 124 to modify the data within data structures 152 and 154.

Figure 8:
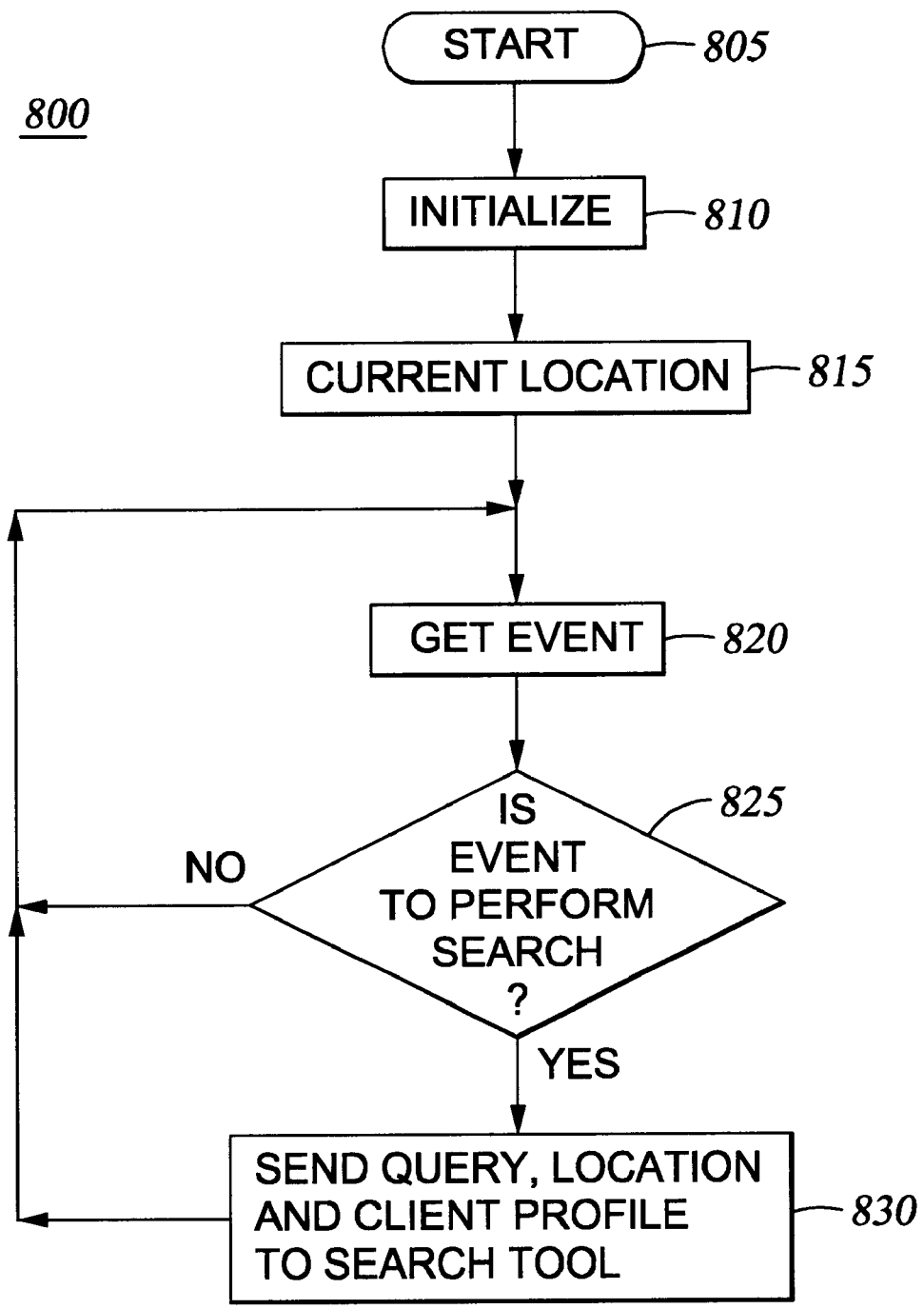
FIG. 8 depicts a flow diagram of a method of initiating an adaptive search query based on a geographical location or user profile.

FIG. 8 depicts a flow diagram of a method 800 for initializing a search query with respect to a location or a profile. As necessary, FIGS. 1–7 are referenced in the following discussion of FIG. 8.

The method 800 of Figure is entered into at step 805, when for example the user executes the query translation program 143 by executing the search mode button 210 within a search tool HTTP web page via electronic document 146. At step 810, the search tool 147 is initialized and prepares to receive a search request from the browser program 140 including the search words from the user and the selection of the location button 235, the profile button 230, or normal button 220. At step 815, the browser program 140 is adapted to set the default location by retrieving the last current location of the client 122 with respect to the setting of the geographic location, city, state, country, and the like, and displaying the location on location selection window 325. In one aspect, the current physical location may be obtained through a GPS input device 136. In another aspect, if the location is unknown and/or not retrievable, method 800 may leave a blank or a comment such as "please select the location" with the location selection window 325 allowing the user to specify the location.

At step 820, the method 800 gets an event. When an event is received at step 820, the method 800 proceeds to step 825 to determine if the event is a search query. If the event is unrelated to a search query, method 800 proceeds to step 820 to get the next event. If the event is related to a search query, method 800 proceeds to step 830. At step 830, the user query and the selection of location, profile, or normal are sent to the search tool 147 via browser program 140. Subsequently, method 800 returns to step 820 to get the next event. The method 800 may be repeated numerous times for various queries until the client computer 122 or the browser program 140 is shut down.

Figure 9:
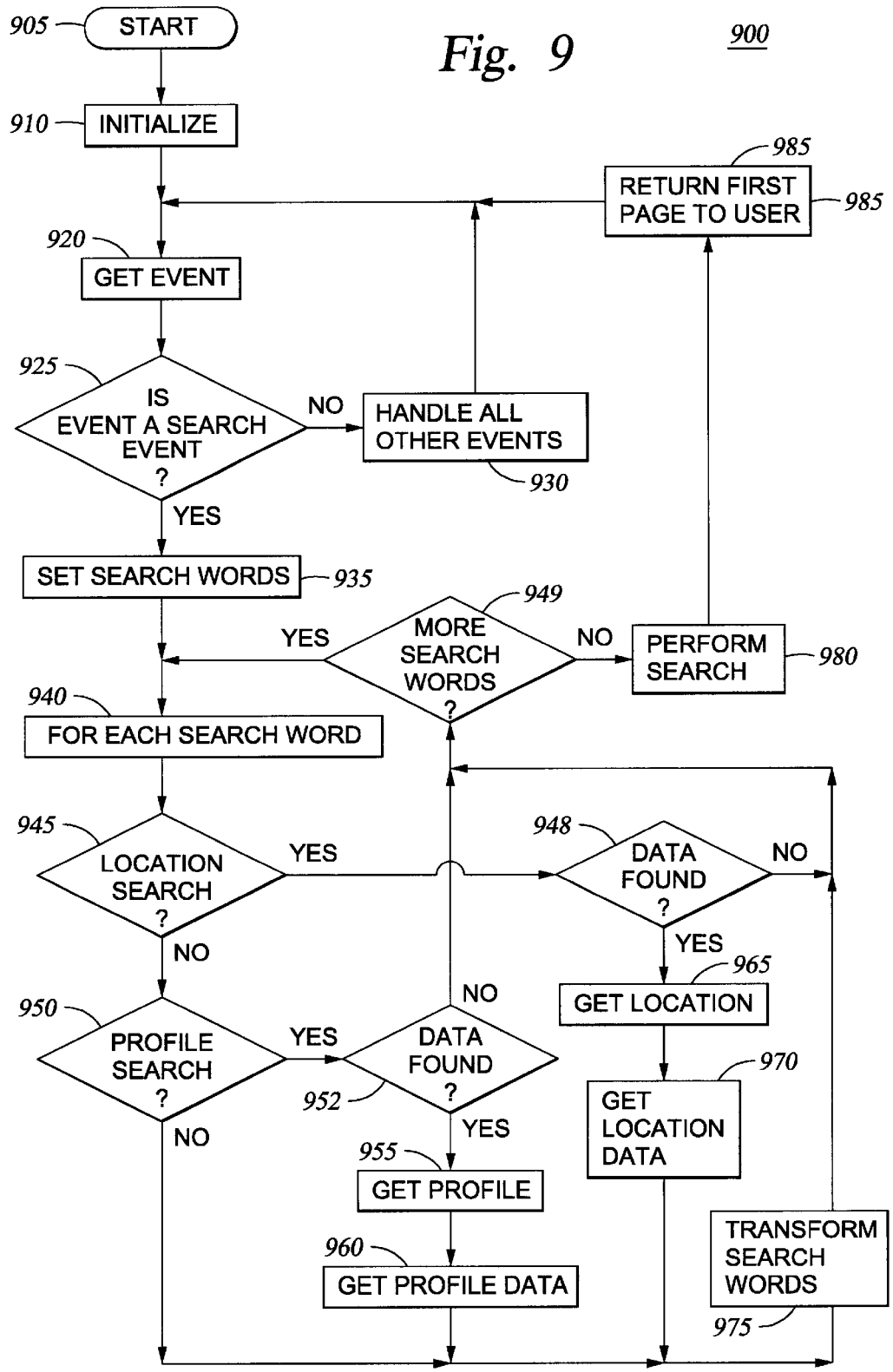
FIG. 9 depicts a flow diagram of a method of an adaptive search query based on a geographical location or user profile.

FIG. 9 depicts a flow diagram of a method 900 for translating a search query to a new search query including word meanings with respect to a location or a profile, and performing the search. As necessary, FIGS. 1–8 are referenced in the following discussion of FIG. 9. In general, FIG. 9 depicts an embodiment of a method 900 for utilizing query translation program 143 adapted for translating a search query to a new (modified) search query with respect to a location or profile, searching the network 126 with search tool 147, and facilitating an output of final results from the network search tool 147 to the browser program 140 for display to an end user. The method of FIG. 900 is entered into at step 905, when for example a search query event is received from step 830. At step 910, the search tool 147 and query translation program 143 are initialized.

At step 920, the method 900 receives an event, such as a search event. Additionally, depending upon the particular configuration of method 900 one of the parameters passed in is the location from step 830. At step 925, the method 900 determines whether a search event has occurred. If a search event has not occurred then the method 900 proceeds to step 930 and handles the event as known the art. If the event is a search event, the method 900 proceeds to step 935. At step 935, the method 900 retrieves the search words (i.e., the search words within the query), the client location from step 830 including the user selections and/or modifications from either location criteria window 315 or the profile criteria window 415. At step 940, the method 900 receives a search word from step 935 and proceeds to step 945 to determine if the search query is related to word meanings with respect to a location search selection, i.e., the user selected the location button 225. If the search is not for word meanings related to a location then the method 900 proceeds to step 950 described below. If the search is related to a location, the method 900 proceeds to step 948.

At step 948, the method 900 determines whether the search word is within the search word column 602 within the location data structure 152 and if the search word has corresponding translation keyword data within the corresponding location keyword data column 604–610. For example, if the search word is "pop" and the location obtained is "San Francisco", then the translation keyword data corresponding to the record for the search word "pop" and the location column 604 for "San Francisco" is "music" If the search word does not exist with column 602, or the location does not exist within columns 604–610, or there is no corresponding keyword data from the location keyword columns 604–610, then the method 900 proceeds to step 949 to query whether the original search query contains more search words. If so, the next search word is retrieved for processing at step 940. If corresponding data is located at step 948, the method 900 proceeds to step 965.

At step 965, the method 900 retrieves the location received at step 920 and proceeds to step 970, to retrieve at least one of the translation keyword data related to the location within location data structure 152. For example, if the user had selected "San Francisco" as the location and "pop" for the query search word, the method 900 will retrieve the translation keyword data "music" from the location keyword data structure location column 604 pertaining to the location of San Francisco and the row under column 602 pertaining to the translation keyword data of "pop". Subsequently, method 900 proceeds to step 975 described below.

At step 950, the method 900 determines if the search is related to word meanings with respect to a profile, i.e., the user selected the profile button 230. If the search is not related to word meanings with respect to a profile, i.e., the user selected the normal button 220, the method 900 proceeds to step 975 described below. If the search is related to word meanings with respect to a profile, the method 900 proceeds to step 952. If the search word does not exist or have corresponding keyword data in the columns 708–712, then the method 900 proceeds to step 949 to query whether the original search query contains more search words. If so, the next search word is retrieved for processing at step 940. If the search word has corresponding search word data within the corresponding location data column 708–712, the method 900 proceeds to step 955.

At step 955, the method 900 retrieves the profile selection received at step 830 and proceeds to step 960 to retrieve at least one of the translation keyword data related to the profile within profile data structure 154. For example, with reference to FIG. 7, if the search word is "pop" and the profile is "a 15 year old female", then the translation keyword data corresponding to the record for the search word "pop" is "soft drink" and "cola" from columns 708 and 710, respectively. Subsequently, method 900 proceeds to step 975.

At step 975, for a location selection, the query translation program 143 translates the search word(s) into at least one translation keyword from the location columns 604–610. For a profile selection, the query translation program 143 translates the search word(s) into at least one translation keyword from the profile data column 708–712. For a normal selection, i.e. the normal button 220 was selected, there would be no translation keyword data, and the search would proceed as known in the art. In one aspect, the query translation program 143 replaces each search word with at least one of the translation keyword obtained from steps 960 or 970. In another aspect, the query translation program 143 combines the translation keyword to the original search words.

Once all of the translation values have been received and processed by query translation program 143, method 900 proceeds to step 980 to perform a search using the search tool 142. If data was located at either of steps 948 or 952, the search is performed using a modified search query (i.e., including the translation keyword(s)). If no data was located, the search is performed using the original unmodified search query. In one embodiment, if no data was located, a message may be issued to the user indicating that no translation keyword data were found. At step 985, the search tool results returned to the browser program 140 (and placed in the results data structure 131) are displayed to the user on output device 138.

Subsequently, the method 900 proceeds to step 920 to get the next event. The method 900 may be repeated numerous times for various queries until the client computer 122 or the browser program 140 is shut down.

Although various embodiments which incorporate the teachings of the invention have been shown and described in detail herein, those skilled in the art can readily devise many other varied embodiments within the scope of the invention. For example, it is contemplated that the query translation program 143 may be integral to the browser program 140. Alternatively, the query translation program 143 may be integral to the search tool 147. In still another embodiment, the search tool 147 may be located on the client computer 122. Furthermore, it is contemplated that the location data structure 152 and the profile data structure 154 may be used in combination, i.e., the user may select both the "location" button 225, and "profile" button 230. For example, given the location is San Francisco, the search word "pop" has the corresponding translation keyword of "music" with respect to the location data structure 152, and "soft drink" with respect to the profile data structure 154. These subsequent search for these translation keywords results in a search where the results are related to both "soft drink" and "music". In another embodiment, the translation keywords have flags or other "wild card" characters to extend the search to partial words and phrases. In one aspect of the invention, the user profile data structure 150 is used as selection data within the profile data structure 154 to define the profile for the search. For example, if the user were a 15-year-old female, then the user's profile would be used by the query translation program 143 to match and set the selection of the profile data to 15-year-old females.

While foregoing is directed to the preferred embodiment of the invention, other and further embodiments of the invention may be devised without departing from the basic scope thereof, and the scope thereof is determined by the claims that follow.

What is claimed is:

1. A method of searching for information on a computer connected to a network of computers, the method comprising:

receiving a search query comprising search content;

selecting a translation keyword on the basis of a user selection of at least one of a demographic value and a profile value, wherein the translation keyword has a predefined association with the search content;

modifying the search query with at least one translation keyword to provide a modified search query, wherein modifying the search query comprises combining the search content with the at least one translation keyword;

providing the modified search query to a search tool;

searching the network, by the search tool, using the modified search query; and returning search results by the search tool to a browser program for display.

2. The method of claim 1, wherein the search query is received from the browser program operating on the network of computers.

3. The method of claim 1, wherein modifying the search query is a user selectable step.

4. The method of claim 1, wherein the demographic value and the profile value are selected by a user submitting the query from a graphical user interface screen of the browser program.

5. The method of claim 1, wherein the profile value is selected from a group of profile values comprising at least one of ethnic groups, religion, race, age, sex, income, assets, political affiliation, general demographic data, dialect, likes, dislikes, and combinations thereof.

6. The method of claim 1, wherein the demographic value is a location value.

7. The method of claim 6, wherein the location value is selected from the group comprising at least one of countries, geographic regions, provinces, states, cities, and combinations thereof.

8. A signal-bearing medium containing a query translation program, wherein the translation program, when executed by a processor, performs a method of searching for information on a computer connected to a network of computers, the method comprising:

receiving a search query comprising search content;

selecting a translation keyword on the basis of a user selection of at least one of a demographic value and a profile value, wherein the translation keyword has a predefined association with the search content;

modifying the search query with at least one translation keyword to provide a modified search query, wherein modifying the search query comprises combining the search content with the at least one translation keyword;

providing the modified search query to a search tool;

searching the network, by the search tool, using the modified search query; and returning search results by the search tool to a browser program for display.

9. The signal-bearing medium of claim 8, wherein the demographic value and the profile value are selected by a user submitting the query from a graphical user interface screen of the browser program.

10. The signal-bearing medium of claim 8, wherein the profile value is selected from a group of profile values comprising at least one of ethnicity, religion, race, age, sex, income, assets, political affiliation, general demographic data, dialect, likes, dislikes, and combinations thereof.

11. The signal-bearing medium of claim 8, wherein the demographic value is a location value.

12. The signal-bearing medium of claim 11, wherein the location value is selected from the group comprising at least one of countries, geographic regions, provinces, states, cities, and combinations thereof.

13. A method of searching for information, on a computer connected to a network of computers, the method comprising:

provide a plurality of translation keywords each having pre-defined associations with different query terms;

receiving a search query comprising search content;

receiving a user selection of at least one of a demographic value and a profile value;

selecting, from the plurality of translation keywords, at least one translation keyword having a pre-defined association with the search content wherein the selecting is done on the basis of the user selection;

modifying, using the at least one translation keyword, the search query to provide a modified search query, wherein modifying the search query comprises combining the search content with the at least one translation keyword; and providing the modified search query to a search tool configured to perform a search for results satisfying the modified search query.

14. The method of claim it wherein the pre-defined association is at least one of a demographic association and a profile association.

15. The method of claim 13, wherein the demographic value and the profile value are selected by a user submitting the query from a graphical user interface screen of the browser program.

16. The method of claim if wherein the profile value is selected from a profile group comprising at least one of ethnicity, religion, race, age, sex, income, assets, political affiliation, general demographic data, dialect, personal likes, personal dislikes, and combinations thereof.

17. The method of claim 13, wherein the demographic value is a location value.

18. The method of claim 17, wherein the location value is selected from the group comprising at least one of countries, geographic regions, provinces, states, cities, and combinations thereof.

19. A signal-bearing medium containing a query translation program which, when executed by a processor, performs a method of searching for information on a computer connected to a network of computers, the method comprising:

providing a plurality of translation keywords each having pre-defined associations with different query terms;

receiving a search query comprising search content;

receiving a user selection of at least one of a demographic value and a profile value;

selecting, from the plurality of translation keywords, at least one translation keyword having a pre-defined association with the search content, wherein the selecting is done on the basis of the user selection;

modifying, using the at least one translation keyword, the search query to provide a modified search query, wherein modifying the search query comprises combining the search content with the at least one translation keyword; and providing the modified search query to a search tool configured to perform a search for results satisfying the modified search query.

20. The signal-bearing medium of claim 19, wherein the profile association is selected from a profile group comprising at least one of ethnic groups, religion, race, age, sex, income, assets, political affiliation, general demographic data, dialect, likes, dislikes, and combinations thereof.

21. The signal-bearing medium of claim 19, wherein the demographic association is a location association.

22. The signal-bearing medium of claim 21, wherein the location association is selected from the group comprising at least one of countries, geographic regions, provinces, states, cities, and combinations thereof.

* * * * *

UNITED STATES PATENT AND TRADEMARK OFFICE
CERTIFICATE OF CORRECTION

PATENT NO. : 6,850,934 B2 Page 1 of 1
DATED : February 1, 2005
INVENTOR(S) : Cary Lee Bates and John Matthew Santosuosso It is certified that error appears in the above-identified patent and that said Letters Patent is hereby corrected as shown below:

Column 13,
Line 30, "it" should be -- 13, --.
Line 37, "if" should be -- 13, --.

Signed and Sealed this

Tenth Day of May, 2005

JON W. DUDAS
*Director of the United States Patent and Trademark Office*